UNITED STATES PATENT OFFICE.

ALBRECHT THIELE, OF BERLIN, GERMANY, ASSIGNOR TO CHEMISCHE FABRIK AUF ACTIEN (VORM. E. SCHERING), OF BERLIN, GERMANY.

PYRROLIDIN DERIVATIVE.

1,148,637.  Specification of Letters Patent.  Patented Aug. 3, 1915.

No Drawing.  Application filed November 14, 1913. Serial No. 801,074.

*To all whom it may concern:*

Be it known that I, ALBRECHT THIELE, doctor of philosophy, chemist, citizen of the German Empire, residing at Berlin, Kingdom of Prussia, Empire of Germany, have invented a new and useful Improvement in Pyrrolidin Derivatives, of which the following is a specification.

The subject matter of this invention is new pyrrolidin derivatives which may be useful in therapeutics.

The new compounds may be obtained by condensing with or without a solvent, an acidylated pyroracemic acid ester either: (1) with benzaldehyde and a substituted anilin, (2) with a substituted benzaldehyde and anilin or a substituted anilin, (3) with benzaldehyde and heterocyclic compounds, or (4) with heterocyclic aldehydes and amins.

The new pyrrolidin derivatives are insoluble in water, more or less easily soluble in alcohol, difficultly soluble in ether and benzene, soluble in alkalis and are stable when heated with dilute acids and alkalis. Their alcoholic solutions assume a dark red color upon the addition of ferric chlorid.

The new compounds may be represented by the following general formula:

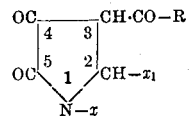

in which $x$ and $x_1$ represent aromatic or heterocyclic residues and R represents an aliphatic or aromatic radical.

Examples.

(1.) 106 parts of m-toluidin are heated with 106 parts benzaldehyde for a quarter of an hour on a water bath, 160 parts of ascetylpyroracemic acidethylester being gradually added thereto while shaking. The mixture is then heated for from four to five hours and after standing for twelve hours the solidified mass is treated with a 5% caustic soda solution and the product of reaction precipitated therefrom with dilute hydrochloric acid is recrystallized from dilute alcohol. It melts at 184° C.–185° C.

(2.) *The manufacture of p-methyldiphenyl benzoyldiketopyrrolidin.*—106 parts p-toluidin and 106 parts benzaldehyde are heated in an absolute alcoholic solution for a quarter of an hour upon a water bath. 242 parts sodiumbenzoylpyroracemic acidethylester dissolved in 1000 parts of absolute alcohol and 60 grams glacial acetic acid are then gradually added. After this addition the mixture is heated for another two hours and then after standing for twelve hours it is acidified with dilute hydrochloric acid; the precipitate after removal of the liquor by suction is dissolved in 2–3% caustic soda solution, precipitated with a dilute mineral acid and recrystallized from 96% alcohol. The new compound which commences to soften at about 240° C. melts at 248° C.

(3.) *The manufacture of 1-o-tolyl-2-phenyl-3-acetyl-4,5-diketopyrrolidin.*—

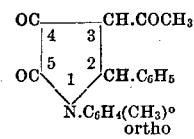

106 parts o-toluidin and 106 parts benzaldehyde are dissolved in 1000 parts of ether, treated with 158 parts of acetylpyroracemic acidester and allowed to stand for 24 hours. After the addition of a 5% soda solution the ether is distilled off and the resulting compound purified through its sodium salt. It crystallizes from a mixture of benzene, petrol and ether in rose colored crystals which melt at 177–179° C.

(4.) *The manufacture of 1-o-methoxyphenyl-2-phenyl-3-acetyl-4,5-diketopyrrolidin.*—

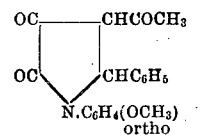

122 parts of anisidin and 106 parts of benzaldehyde are allowed to stand with 158 parts acetylpyroracemic acid ester for twenty four hours. The above resulting compound after purification and recrystallization from 96% alcohol melts and decomposes at 225–227° C.

(5.) *The manufacture of 1-phenyl-2-piperonyl-3-acetyl-4,5-diketopyrrolidin.*—

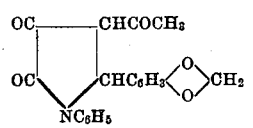

92 parts anilin and 150 parts piperonal are heated for some hours in benzene with 158 parts acetylpyroracemic acidester. After purification and recrystallization from 96% alcohol the pyrrolidin derivative above named is obtained which melts at 197° C.

(6.) *The manufacture of 1-p-tolyl-2-p-dimethylaminophenyl-3-acetyl-4.5-diketopyrrolidin.—*

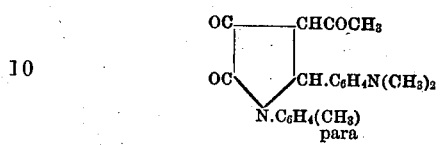

158 parts acetylpyroracemic acidester are allowed to react for 24 hours and with frequent shaking upon a benzene solution of 106 parts p-toluidin and 148 parts of p-dimethylaminobenzaldehyde. The final product is a brown powder which melts and decomposes at 166° C.

(7.) *The manufacture of 1-quinolyl-2-phenyl-3-acetyl-4.5-diketopyrrolidin.—*

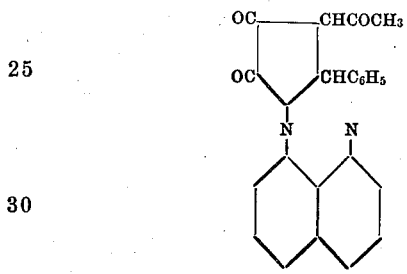

158 parts of acetylpyroracemic acidester are caused to react upon 144 parts of 8-aminoquinolin and 106 parts of benzaldehyde mixed with benzene. After purification the above named product is obtained which melts and decomposes at 222° C.

(8.) *The manufacture of 1-(1-phenyl-2.3-dimethyl-5-pyrazolyl)-2-phenyl-3-acetyl-4.5-diketopyrrolidin.—*

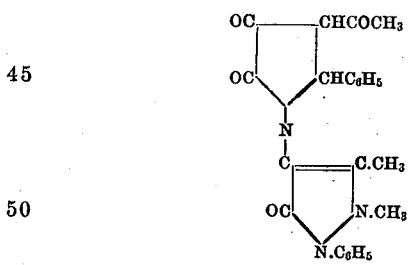

61 parts of phenyldimethylaminopyrazolone together with 32 parts of benzaldehyde and 50 parts acetylpyroracemic acidester are dissolved in 500 parts benzene and heated to 100–110° C. for 5 to 6 hours in a tube.

After purification the compound appears as a light brown powder which gradually decomposes at more elevated temperatures. It has a bitter taste, gives a brown red coloration when treated with ferric chlorid and is soluble in organic solvents with the exception of ether and a mixture of petrol and ether.

(9.) *The manufacture of 1-phenyl-2-furfuryl-3-acetyl-4.5-diketopyrrolidin.—*

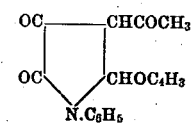

96 parts furfurol, 158 parts acetylpyroracemic acidester and 93 parts anilin are dissolved in 1000 parts benzene and after standing for many hours heated for two hours upon a water bath. After purification the above compound is obtained which recrystallized from benzene or 40% alcohol forms yellow-green crystals. These melt and decompose at 190° C. They dissolve in alcohol and with difficulty in ether.

(10.) *The manufacture of 1-o-methoxyphenyl-2-phenyl-3-benzoyl-4.5-diketopyrrolidin.—*

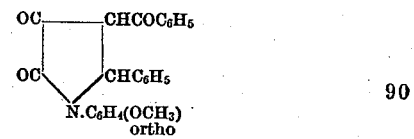

110 parts benzoylpyroracemic acid ester dissolved in benzene are allowed to react upon 55 parts benzaldehyde and 65 parts o-anisidin for 24 hours. After recrystallization from 50% alcohol crystals are obtained which become soft at about 205° C. and melt and decompose at 215–217° C.

I claim as my invention:

As new products the herein described diketo-pyrrolidin derivatives, the same being condensation products of an acidylated pyroracemic acid ester with aldehydes and amins and being insoluble in water, more or less easily soluble in alcohol, difficultly soluble in ether and benzene, soluble in alkalis and being stable when heated with dilute acids and alkalis, substantially as set forth.

In testimony whereof I have hereunto set my signature in the presence of two subscribing witnesses.

Dr. ALBRECHT THIELE.

Witnesses:
 Woldemar Haupt,
 Henry Hasper.